(12) United States Patent
Ikenaga et al.

(10) Patent No.: US 7,713,630 B2
(45) Date of Patent: May 11, 2010

(54) GLASS OPTICAL ELEMENT AND METHOD FOR MANUFACTURING THE SAME

(75) Inventors: Shuji Ikenaga, Kashiba (JP); Toshiya Tomisaka, Yao (JP)

(73) Assignee: Konica Minolta Opto, Inc., Tokyo (JP)

( * ) Notice: Subject to any disclaimer, the term of this patent is extended or adjusted under 35 U.S.C. 154(b) by 225 days.

(21) Appl. No.: 11/888,853

(22) Filed: Aug. 2, 2007

(65) Prior Publication Data
US 2008/0032137 A1    Feb. 7, 2008

(30) Foreign Application Priority Data
Aug. 7, 2006   (JP)   .............................. 2006-214266

(51) Int. Cl.
   *B32B 17/06*   (2006.01)
(52) U.S. Cl. ..................................... 428/426
(58) Field of Classification Search .................. 428/426
   See application file for complete search history.

(56) References Cited
U.S. PATENT DOCUMENTS
4,481,023 A   11/1984   Marechal et al.
2004/0187522 A1 *  9/2004   Kikuchi .......................... 65/39
2004/0231362 A1   11/2004   Nishikawa FOREIGN PATENT DOCUMENTS
JP   2003-292327      10/2003
JP   2006-096579   *   4/2009

* cited by examiner

*Primary Examiner*—Gwendolyn Blackwell
(74) *Attorney, Agent, or Firm*—Brinks Hofer Gilson & Lione (57) ABSTRACT

A glass optical element including: a first surface which is formed by transcription of the first transfer surface of the molding die; a second surface which is formed by transcription of the second transfer surface of the molding die and is facing the first surface; and a side surface of the outer periphery formed by transcription of the side transfer surface of the molding die; wherein the glass optical element is characterized by further containing: a first free surface which is formed without contacting with any of the surfaces of the molding die and is connecting the first surface and the side surface of the outer periphery; and a second free surface which is formed without contacting with any of the surfaces of the molding die and is connecting the aforementioned second surface and the side surface of the outer periphery.

2 Claims, 7 Drawing Sheets

PRIOR ART

FIG. 8

PRIOR ART

GLASS OPTICAL ELEMENT AND METHOD FOR MANUFACTURING THE SAME

This application is based on Japanese Patent Application No. 2006-214266 filed on Aug. 7, 2006, in Japanese Patent Office, the entire content of which is hereby incorporated by reference.

TECHNICAL FIELD

The present invention relates to a glass optical element and a method for manufacturing the same.

BACKGROUND

In recent years, a glass optical element has been employed over an extensive range as a digital camera lens, optical pickup lens for DVD, camera lens for mobile phone and coupling lens for optical communications. Such a glass optical element is often manufactured by a press molding method wherein a softened glass material is compression-molded by a molding die.

The level of performances required of a glass optical element is getting increasingly higher to catch up with the trend for more compact size and higher accuracy of various types of optical equipment. At the same time, there has been an increasing demand for a further reduction in manufacturing costs. Studies are being made on a method where the optical surface and the circumferential side surface of the glass optical element are simultaneously formed by molding.

As one of such methods, a method is known wherein a molding glass material of a predetermined mass and shape is prepared, this molding glass material and a molding die having a side transfer surface for forming a side of the outer periphery of a glass optical element are heated to the temperature that allows deformation of the glass, and then a glass optical element is produced by compression molding (U.S. Pat. No. 4,481,023).

Figure 7:
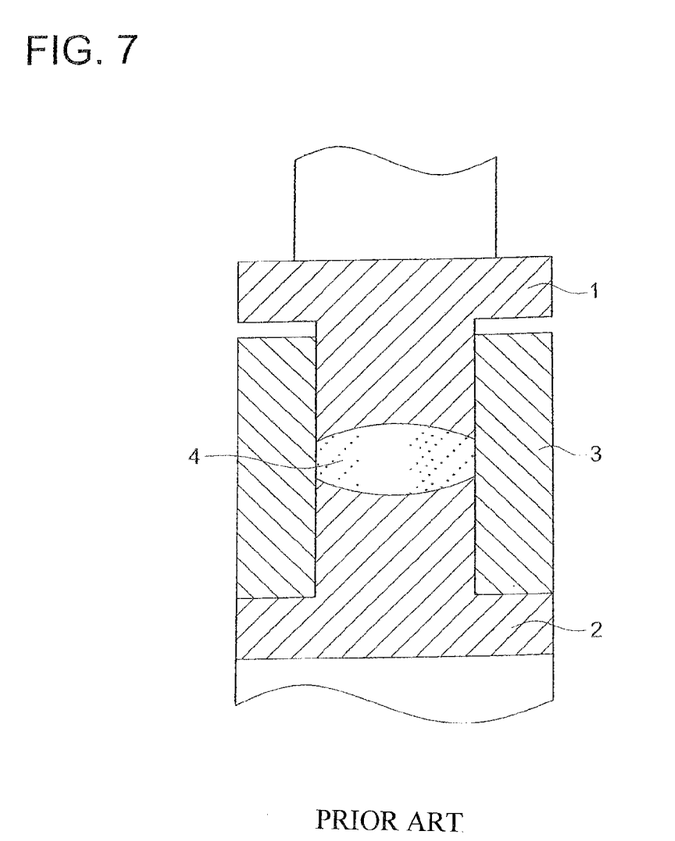
FIG. 7 is a cross sectional view of a molding die in the conventional method 1.
Figure 8:
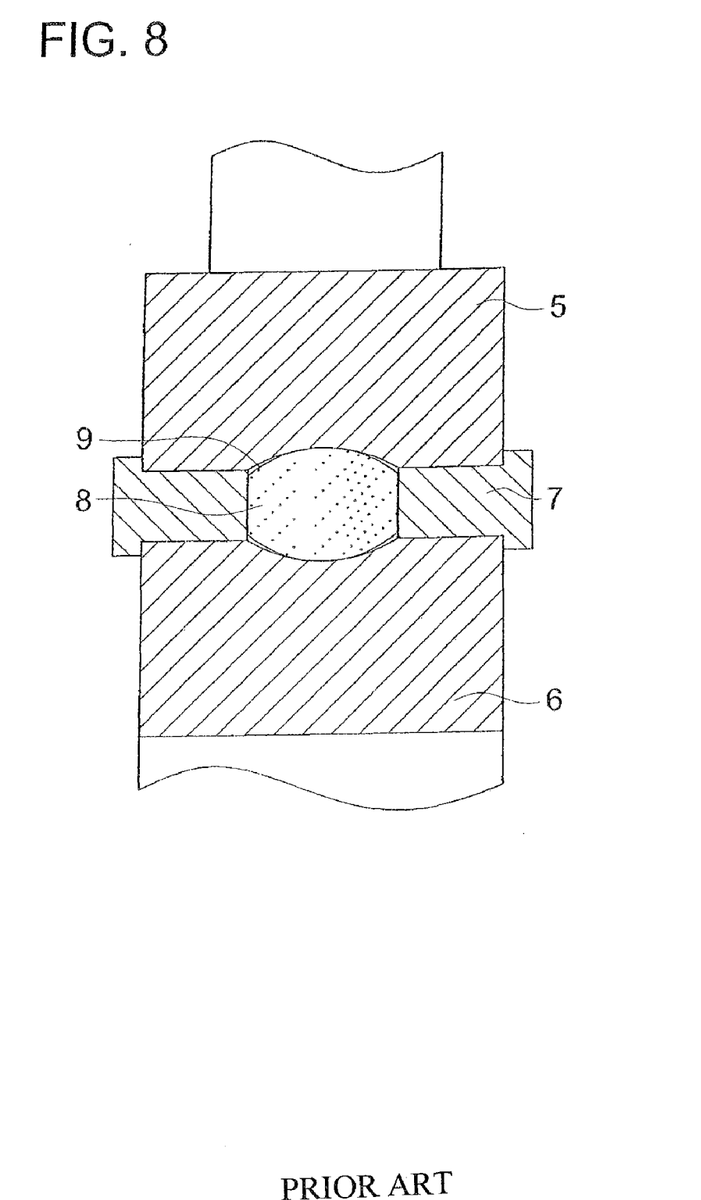
FIG. 8 is a cross sectional view of a molding die in the conventional method 2.

Two molding methods disclosed in U.S. Pat. No. 4,481,023 will be described with reference to FIG. 7 and FIG. 8. FIG. 7 and FIG. 8 are diagrams showing the cross section of a molding die in the step of compression molding. FIG. 7 shows a molding die used in the first method, while FIG. 8 represents the molding die employed in the second method. In the first method, a molding die made of an upper mold 1, lower mold 2, and side transfer member 3 as shown in FIG. 7 is employed, and the upper mold 1 moves downward until the glass fills up a cavity (a space having the shape of a glass optical element inside the molding die), whereby pressure is applied to the glass (hereinafter referred to as "conventional method 1"). The thickness of a glass optical element 4 is determined by the volume of glass. In the second method, a molding die made of an upper mold 5, lower mold 6 and side transfer member 7 as shown in FIG. 8 is utilized, and the upper mold 5 stops at the position in contact with a side transfer member 7. Since the cavity is not completely filled with glass, some portions of the free glass surface 9 not being restricted by the mold are contained in the glass optical element 8 in this molding method (hereinafter referred to as "conventional method 2"). The thickness of the glass optical element 8 is determined by the thickness of the side transfer member 7.

In the meantime, differently from the method of using the molding glass material of a predetermined mass and shape, a method of compression molding is proposed. According to this proposal, a molding die made up of an upper mold, lower mold and side transfer member is heated, and the molten glass is dropped onto the lower mold. While the temperature is in the range wherein glass can be deformed by pressure, compression molding is provided using a molding die (Unexamined Japanese Patent Application Publications No. 2003-292327 and US2004/0231362).

However, in the aforementioned conventional method 1, the upper mold moves down until the cavity is filled with glass. This has caused such problems as quality failures wherein burrs and nicks are produced on both ends on the side of the outer periphery (the boundary between the surface transferred by the upper mold and the side surface of the outer periphery, and the boundary between the surface transferred by the lower mold and the side surface of the outer periphery).

In the aforementioned conventional method 2, some portions of the free glass surface not restricted by the die are contained in the glass optical element, such a problem as a burr or nick does not occur. However, since the movement of the upper mold 5 is restricted by the side transfer member 7, this method involves a serious defect wherein pressure applied to the glass optical element cannot be maintained in the step of cooling and shrinkage. Thus, this method has been unable to produce an optical element having a high precision optical surface.

For the optical element having a small diameter or the optical element wherein the optical surfaces on the front and rear have a similar shape, there has been a demand for such an arrangement that both ends on the side surface of the outer periphery are shaped differently to distinguish between the front and rear of the optical element. However, in the aforementioned conventional methods 1 and 2, it has been difficult to make a difference in the shape of the aforementioned portion, and the shape of this portion cannot be used to distinguish between the front and rear of the optical element.

Further, the Unexamined Japanese Patent Application Publication No. 2003-292327 and 2004-339039 also fail to disclose a glass optical element manufacturing method that provides a high precision optical surface and prevents a quality failure such as a burr or nick from occurring on both ends on the side surface of the outer periphery.

SUMMARY

An object of the present invention is to solve the aforementioned technical problems and to provide a glass optical element and a method for manufacturing the same, wherein a high precision optical surface is provided without any nick or other defects occurring on the side surface of the outer periphery, and easy identification between the front and rear is ensured.

In view of forgoing, one embodiment according to one aspect of the present invention is a glass optical element, comprising:

a first surface which is formed by transcription of a first transfer surface of a molding die;

a second surface which is formed by transcription of a second transfer surface of the molding die and faces the first surface;

a peripheral side surface which is formed by transcription of a side transfer surface of the molding die;

a first free surface which is formed without contacting with any one of the molding die surfaces and connects the first surface and the peripheral side surface; and a second free surface which is formed without contacting with any one of the molding die surfaces and connects the second surface and the peripheral side surface.

According to another aspect of the present invention, another embodiment is a glass optical element, comprising:

a first surface which is formed by transcription of a first transfer surface of a molding die;

a second surface which is formed by transcription of a second transfer surface of the molding die and faces the first surface;

a peripheral side surface which is formed by transcription of a side transfer surface of the molding die;

a first free surface which is formed without contacting with any one of the molding die surfaces and connects the first surface and the peripheral side surface; and a second free surface which is formed without contacting with any one of the molding die surfaces and connects the second surface and the peripheral side surface, wherein a wider width of widths of the first free surface and the second free surface observed from a direction parallel to a central axis which goes through a center of the first surface and a center of the second surface is greater than or equal to twice a narrower width.

According to another aspect of the present invention, another embodiment is a manufacturing method of a glass optical element, comprising the steps of:

heating a molding die to a predetermined temperature, the molding die including a lower mold having a first transfer surface for forming a first surface of the glass optical element, an upper mold having a second transfer surface for a second surface, facing the first surface, of the glass optical element, and a side transfer member, combined in the lower mold, having a side transfer surface for forming a peripheral side surface of the glass optical element;

dropping molten glass on the lower mold to bring the glass in contact with the first transfer surface;

pressuring the glass on the lower mold to conduct a transcription of the first surface, the second surface and the peripheral side surface by making the upper mold and the lower mold get closer each other; and releasing the glass optical element from the molding die, wherein formed is a first free surface which is formed without contacting with any one of the molding die surfaces and connects the first surface and the peripheral side surface, and formed is a second free surface which is formed without contacting with any one of the molding die surfaces and connects the second surface and the peripheral side surface.

BRIEF DESCRIPTION OF THE DRAWINGS

FIG. 2 (a), FIG. 2 (b), FIG. 2 (c) and FIG. 2 (d) are cross sectional views showing a molding die and a glass optical element in the major steps in the first embodiment;

FIG. 3 (a) and FIG. 3 (b) are cross sectional views showing a glass optical element obtained in the major steps in the first embodiment;

FIG. 5 (a), FIG. 5 (b), FIG. 5 (c) and FIG. 5 (d) are cross sectional views showing a molding die and a glass optical element in the major steps in the second embodiment;

FIG. 6 (a) and FIG. 6 (b) are cross sectional views showing a glass optical element obtained by the second embodiment;

DETAILED DESCRIPTION OF THE PREFERRED EMBODIMENT

While the preferred embodiments of the present invention have been described using specific terms, such description is for illustrative purpose only, and it is to be understood that changes and variations may be made without departing from the spirit or scope of the appended claims. The following describes the embodiments of the present invention with reference to the drawings:

Embodiment 1

Figure 1:
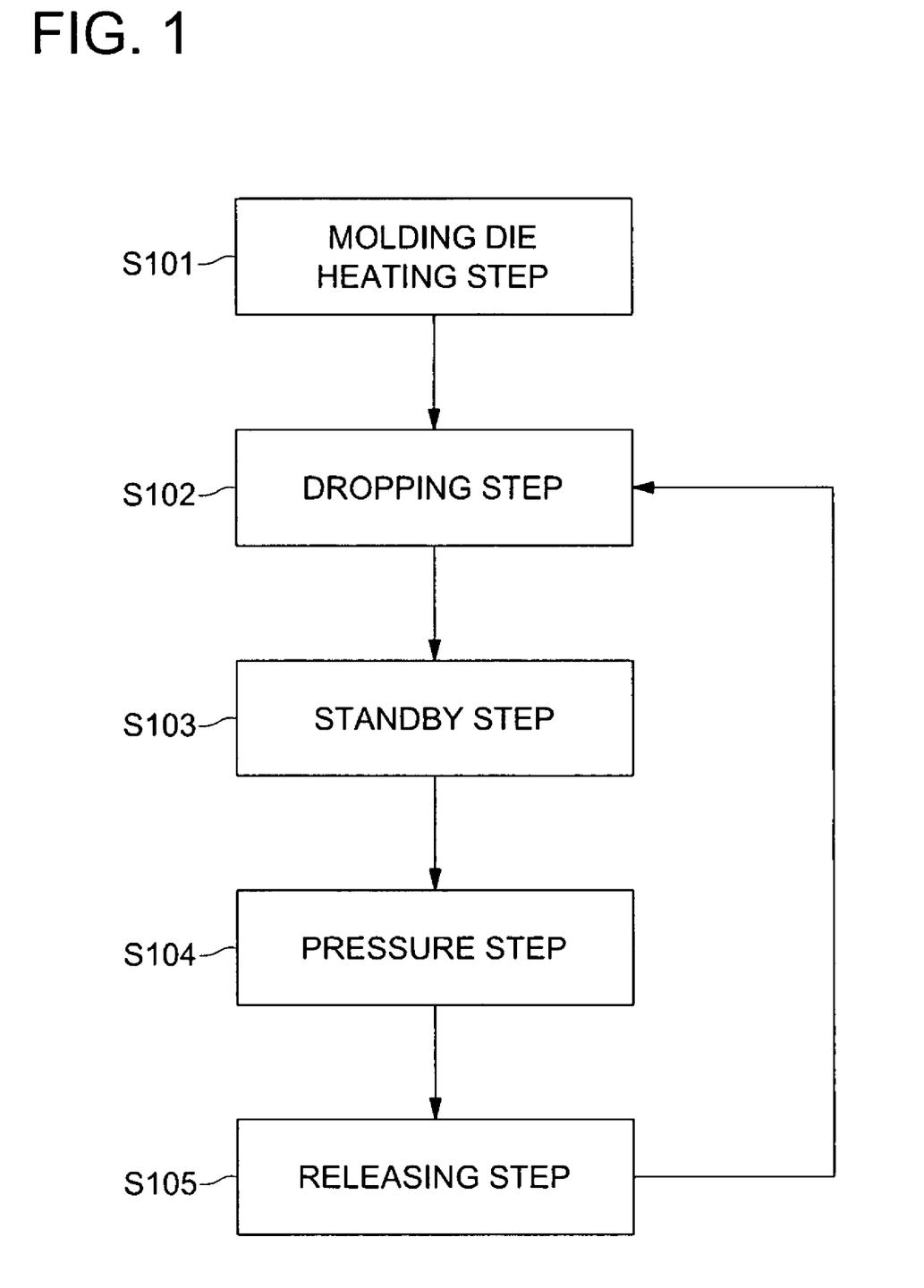
FIG. 1 is a diagram representing various steps employed in the glass optical element manufacturing method as a first embodiment.

The following describes the glass optical element manufacturing method as a first embodiment of the present invention. FIG. 1 is a diagram representing various steps employed in the glass optical element manufacturing method as the first embodiment. FIG. 2 (a), FIG. 2 (b), FIG. 2 (c) and FIG. 2 (d) are cross sectional views showing a molding die and a glass optical element in the major steps in the first embodiment. The following describes the details of steps in due order.

Figure 2A:
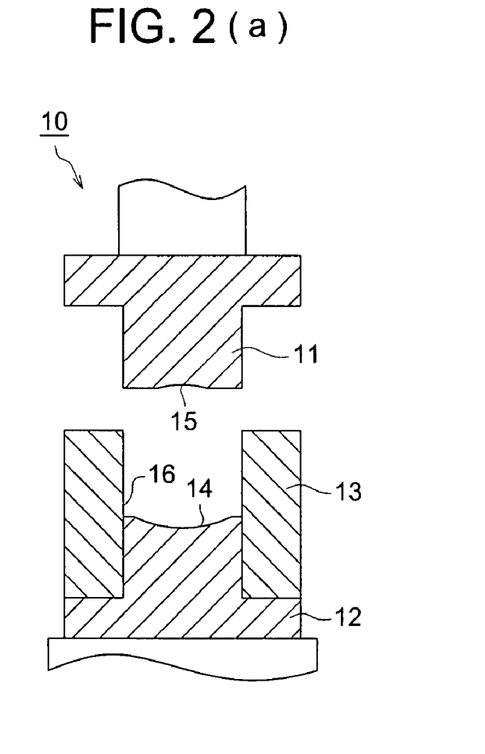

The molding die heating step S101 is a step of heating the molding die to a predetermined temperature. FIG. 2 (a) is a cross sectional view of a molding die 10 in the molding die heating step S101. The molding die 10 used in this embodiment includes an upper mold 11, a lower mold 12, and a side transfer member 13. The lower mold 12 has a first transfer surface 14 of concave shape forming the first surface of the glass optical element, and the upper mold 11 has a second transfer surface 15 of concave shape forming a second surface of the glass optical element. The side transfer member 13 contains the side transfer surface 16 for forming the side surface of the outer periphery of the glass optical element, and is fixed being combined with the lower mold 12.

The material of the upper mold 11, the lower mold 12 and the side transfer member 13 can be selected from among the known materials according to a particular requirement, as a molding die for compression molding of the glass optical element, and is exemplified by a ultrahard material mainly made up of a tungsten carbide, silicon carbon, silicon nitride and aluminum nitride. It is also possible to use these materials whose surfaces are provided with a protective film of metals, ceramics, carbon or the like. The upper mold 11, the lower mold 12 and the side transfer member 13 can be made of one and the same material, or can be made of different materials.

The upper mold 11, the lower mold 12 and the side transfer member 13 can be heated to a predetermined temperature using a heater (not illustrated) and a temperature sensor. It is also possible to make such arrangements that each of the upper mold 11, the lower mold 12, and the side transfer member 13 is provided with a heater and a temperature sensor, and the temperature of each member is adjusted independently. Further, all the molding dies can be heated collectively by one or more heaters. A conventionally known heater can be used as a heater as appropriate. For example, it is possible to use a cartridge heater embedded inside the member or a sheet-like heater in contact with the outside of the member. A conventionally known means such as a platinum temperature measuring resistor or various types of thermistors in addition to various types of thermocouples can be used as a temperature sensor.

In the molding die heating step S101, prior to dropping of molten glass, the molding die is heated to a predetermined temperature in advance. The heating temperatures of the upper mold 11 and the lower mold 12 in the molding die 10 should be selected within the range wherein the optical surface can be correctly transferred onto the glass. Generally, if the upper mold 11 or the lower mold 12 has an excessively low temperature, the optical surface cannot be transferred onto the glass material effectively. Conversely, if the temperature is too high, fusion between the glass and molding die cannot be avoided, and the service life of the molding die will be reduced. Normally, the temperature to be set should be in the range from Tg (glass transition temperature) of the glass −100° C. to Tg+100° C. In practice, the adequate temperature differs according to the material, shape and dimensions of the glass material, the material of the molding die, the type of the protective film, the shape and dimensions of the optical element, position of the heater and temperature sensor, and various such factors. Accordingly, it is preferred to conduct a test to determine an adequate temperature. The heating temperature of the upper mold 11 may be the same as that of the lower mold 12, or may be different therefrom.

The heating temperature of the side transfer member 13 of the molding die 10 is set in the range from Tg (glass transition temperature) of glass −100° C. to Tg+100° C., similarly to the case of the upper mold 11 and the lower mold 12. If the temperature of the side transfer member 13 is too low, the side surface of the outer periphery will be cooled too fast. This will discourage smooth transfer of the optical surface. Conversely, if this temperature is too high, fusion between the glass and the side transfer member cannot be avoided, and the service life of the side transfer member will be reduced. Accordingly, it is preferred to conduct a test to determine an adequate temperature, similarly to the case of the upper mold 11 and the lower mold 12.

FIG. 2 (*a*) shows the upper mold 11 and lower mold 12 combined with the side transfer member 13 being placed face to face with each other and apart from each other, and being heated. It should be noted, however, that their positional relationship in the molding die heating step S101 is not restricted thereto. For example, it is also possible to make such arrangements that the upper mold 11 is moved downward and is inserted into the side transfer member 13 at the time of heating. Alternatively, heating can be performed when the lower mold 12 has been moved to the position wherein the molten glass is received in the next dropping step S102.

Figure 2B:
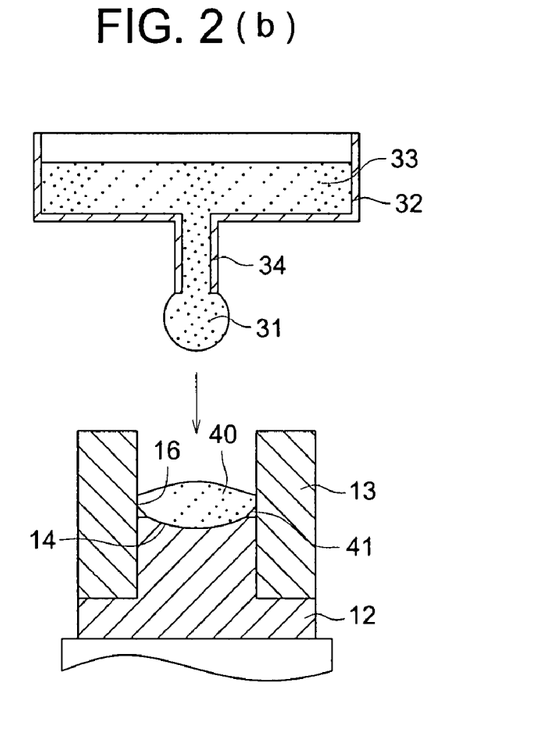

In the dropping step S102, the molten glass 31 is dropped onto the heated lower mold 12 so that glass is placed in contact with the first transfer surface 14 of the lower mold 12 and the side transfer surface 16 of the side transfer member 13. FIG. 2 (*b*) shows the cross sectional view of the molding die and others in the dropping step S102.

The melting furnace 32 is heated by a heater (not illustrated) and the molten glass 33 is stored inside. When a certain mass of glass has been accumulated at the front end of the nozzle 34 provided below the melting furnace 32, it is separated automatically at the front end of the nozzle 34, with the result that a certain mass of glass 31 drops. Generally, the mass of the molten glass to be dropped can be adjusted by the outer diameter of the nozzle 34, and about 0.1 g to 2 g of glass can be dropped, although this may differ according to the type of glass. Further, the interval of dropping the glass can be adjusted according to the inner diameter and the length of the nozzle 34, as well as heating temperature and such related factors. Thus, a desired mass of glass can be dropped at a desired interval by proper setting of these conditions.

It is possible to drop a very small mass of molten glass (e.g. 0.01 g through 0.2 g) according to the method disclosed in the Unexamined Japanese Patent Application Publication No. 2002-154834 wherein small particles of molten glass can be manufactured using a member provided with a penetrating pore.

There is no particular restriction to the type of the glass to be used. A conventionally known glass commonly used for optical applications can be selected to conform to a particular requirement. For example, phosphoric acid based glass, lanthanum based glass can be used.

The glass 40 dropped on the lower mold 12 being heated collides with the lower mold 12, and spreads to come in contact with the first transfer surface 14 of the lower mold 12 and the side transfer surface 16 of the side transfer member 13. This procedure yields a first free surface 41 which connects the first surface and the side surface of the outer periphery of the glass optical element, without coming in contact with any of the surfaces of the molding die 10. If the lower mold 12, the side transfer member 13 or the molten glass 31 is too hot, the first free surface 41 will be hardly formed, or glass will enter the gap on the boundary between the first transfer surface 14 and the side transfer surface 16 with the result that burrs are produced. To avoid such a problem, the temperature of the lower mold 12, the side transfer member 13 or the molten glass 31 should be reduced; then glass will be dropped so as to ensure satisfactory formation of the first free surface 41. For the purpose of preventing burrs, nicks and such related defects, the width of the first free surface, as viewed from the direction parallel to the center axis formed by connecting between the center of the first surface of the glass optical element having been obtained and the center of the second surface, is preferably 0.05 mm or more, more preferably 0.1 mm or more.

Figure 2C:
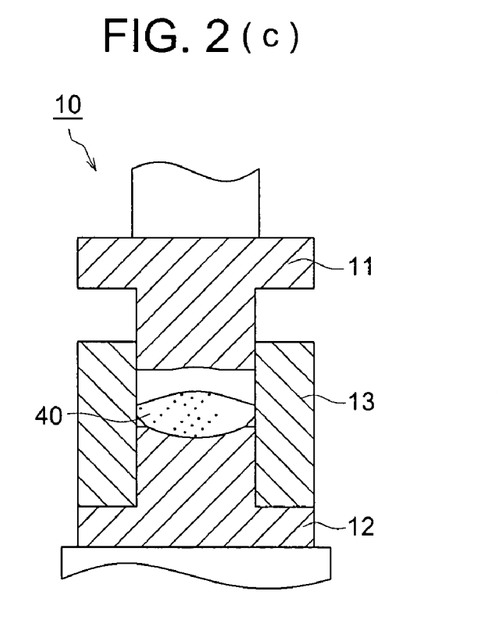

The standby step S103 is a step of standby for a predetermined time with the dropped glass 40 being kept in contact with the first transfer surface 14 and side transfer surface 16, and a step of cooling the glass 40 down to the temperature wherein the second free surface for connecting between the second surface and the side surface of the outer periphery of the glass optical element is formed by pressure applied in the next pressure Step S104. FIG. 2 (*c*) shows the cross section of the molding die 10 in the standby step S103 and the glass 40 having been dropped.

Immediately after having been dropped, the dropped glass 40 is in the molten state of very high temperature. Since it is kept in contact with the first transfer surface 14 and the side transfer surface 16, the glass 40 is cooled due to the heat dissipation through these contact surfaces, with the result that there is a gradual increase in the viscosity.

If the upper mold 11 is moved downward and pressure is applied when the glass is not yet cooled adequately immediately after having been dropped, the glass viscosity is low and glass tends to deform. There is almost no formation of the second free surface for connecting between the second surface and the side surface of the outer periphery of the glass optical element. By contrast, if the standby mode is used for a predetermined time with the dropped glass 40 being kept in contact with the first transfer surface 14 and the side transfer surface 16, the glass will be cooled and the viscosity will be increased. Thus, glass will not be filled by pressure up to the position close to the boundary between the second transfer surface and the side transfer surface. This will cause formation of the second free surface for connecting between the second surface and the side surface of the outer periphery of the glass optical element. As the standby time is longer, the second free surface to be formed will have a greater width.

As described above, the width of the second free surface can be regulated by adjusting the standby time in the standby step S103. For the purpose of removing nicks and other defects, the width of the second free surface, as viewed from the direction parallel to the center axis formed by connecting between the centers of the first and second surfaces of the glass optical element, is preferably 0.01 mm or more. Identification between the front and the rear of the glass optical element is often made by observing from the direction approximately parallel to the center axis formed by connecting between the center of the first surface and the center of the second surface of the glass optical element. Thus, for the purpose of facilitating identification between the front and the rear of the glass optical element, the width of the second free surface, as viewed from the direction parallel to the center axis formed by connecting between the centers of the first and second surfaces of the glass optical element, is preferably equal to or greater than twice the width of the first free surface, or more. Further, the width of the second free surface is more preferably 0.3 mm or more. It should be noted, however, that, if the width of the second free surface is increased, the area of the second surface formed by the transfer of the second transfer surface 15 of the upper mold 12 will be that much smaller. An excessive width of the second free surface is not to be preferred.

The standby time required to allow formation of such a second free surface differs according to the temperatures of the upper mold 11, the lower mold 12, the side transfer member 13 or the molten glass 31, the type of the glass, size and shape of the glass optical element and various related factors. Accordingly, the standby time is preferably determined by conducting a test. In common practice, a standby time of several seconds through several tens of seconds will permit formation of the second free surface having the required width.

Figure 2D:
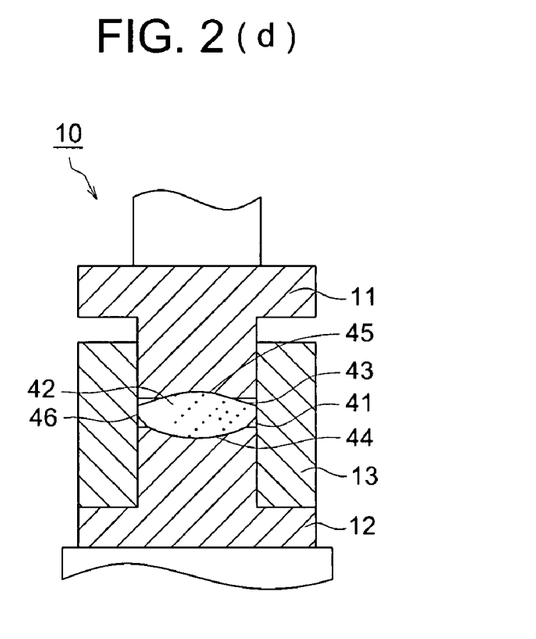

In the pressure step S104, the heated upper mold 11 is arranged face to face with the lower mold 12, and the upper mold 11 and the lower mold 12 are brought relatively close to each other so as to apply pressure to the glass 40. FIG. 2 (d) shows cross section of the molding die 10 in the pressure step S104 and the glass optical element 42 having been produced.

As described above, in the standby step S103, pressure is applied after the glass has been cooled and viscosity has been increased. This procedure forms a second free surface 43 for connecting between the second surface 45 and the side surface of the outer periphery 46 of the glass optical element 42. In the meantime, the process of cooling is particularly advanced in the first surface 44 42 and in the vicinity of the side surface of the outer periphery 46 of the glass optical element. Accordingly, there is almost no change in the first free surface 41 formed in the dropping step S102 by the pressure, and the width remains unchanged.

There is no particular restriction to the type of the pressuring means. The conventionally known pressurizing means such as an air cylinder, hydraulic cylinder and power driven cylinder using a servo motor can be used as appropriate.

The thickness of the central section of the glass optical element varies according to the standby time in the standby step S103. Accordingly, to ensure that the thickness of the central section of the glass optical element is constant, the mass of the glass to be dropped must be adjusted in response to the standby time. If the standby time is to be prolonged, the mass of the glass is reduced for this adjustment. If the standby time is to be shortened, the mass of the glass is to be increased.

In the releasing step S105, pressure is released after the pressure step S104, and the glass optical element 42 is released.

In the pressure step S104, heat is absorbed through the surface of the glass optical element 42 in contact with the molding die 10, and cooling of the glass optical element 42 proceeds. If cooling has proceeded to the temperature wherein the shape of the surface is not collapsed even when the pressure is released, then the pressure is released, the upper mold 11 is removed from the side transfer member 13, and the glass optical element 42 is taken out. To get the temperature wherein the shape of the surface is not collapsed even when the pressure is released, cooling is normally performed down to the temperature close to the Tg of the glass, although it depends on the type of the glass, the size and the shape of the glass optical element and the required precision. The glass optical element 42 can be taken out by a conventionally known mold releasing apparatus and others using a suction method.

After the glass optical element 42 has been released and this step has terminated, procedures from the dropping step S102 to this step S105 are repeated. Then glass optical elements are produced on a continuous basis.

The present invention may contain other steps in addition to the steps S101 through S105. For example, the pressure step S104 can be followed by the step of inspecting the glass optical element. The releasing step S105 can be followed by the step of cleaning the molding die.

Figure 3A:
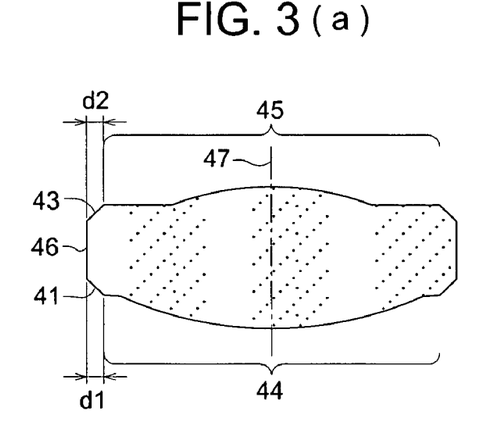
Figure 3B:
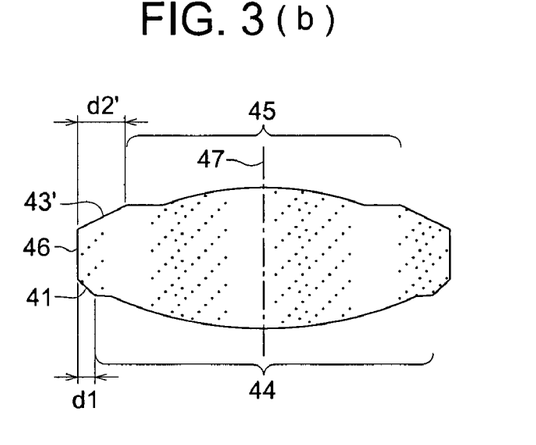

FIG. 3 (a) and FIG. 3 (b) show an example of the cross sectional view of the glass optical element produced in this present embodiment. FIG. 3 (a) shows the glass optical element produced when the standby time in the standby step S103 is relatively short. FIG. 3 (b) shows the glass optical element produced when the standby time in the standby step S103 is relatively long. To ensure that the thickness of the central section is constant, adjustment is made so that the optical element of FIG. 3 (b) will have a smaller mass.

The first surface 44 of the glass optical element is the surface formed by transferring the first transfer surface 14 of the lower mold 12. The second surface 45 is formed by transferring the second transfer surface 15 of the upper mold 11. The side surface of the outer periphery 46 is formed by transferring the side transfer surface 16 of the side transfer member 13.

These glass optical elements includes: a first free surface 41 which is formed without being in contact with any of the surfaces of the molding die 10 and is connecting between the first surface 44 and the side surface of the outer periphery 46; and the second free surfaces 43 and 43' which are formed without being in contact with any of the surfaces of the molding die 10 and are connecting between the second surface 45 and the side surface of the outer periphery 46. This arrangement prevents nicks or other defects from occurring to the side surface of the outer periphery.

In the case of FIG. 3 (b), the standby time is relatively long. Accordingly, the width d2' when the second free surface 43' to be formed is observed from the direction parallel to the center axis 47 formed by connecting between the center of the first surface of the glass optical element and the center of the second surface 45 is greater than the width d2 of the second free surface 43 formed in the case of FIG. 3 (a). The width is three times as large as that of the first free surface 41. Thus, the front and rear sides of the optical element can be easily identified by checking the difference in the width of the two free surfaces on the front and rear sides from the direction almost parallel to the center axis 47.

Embodiment 2

Figure 4:
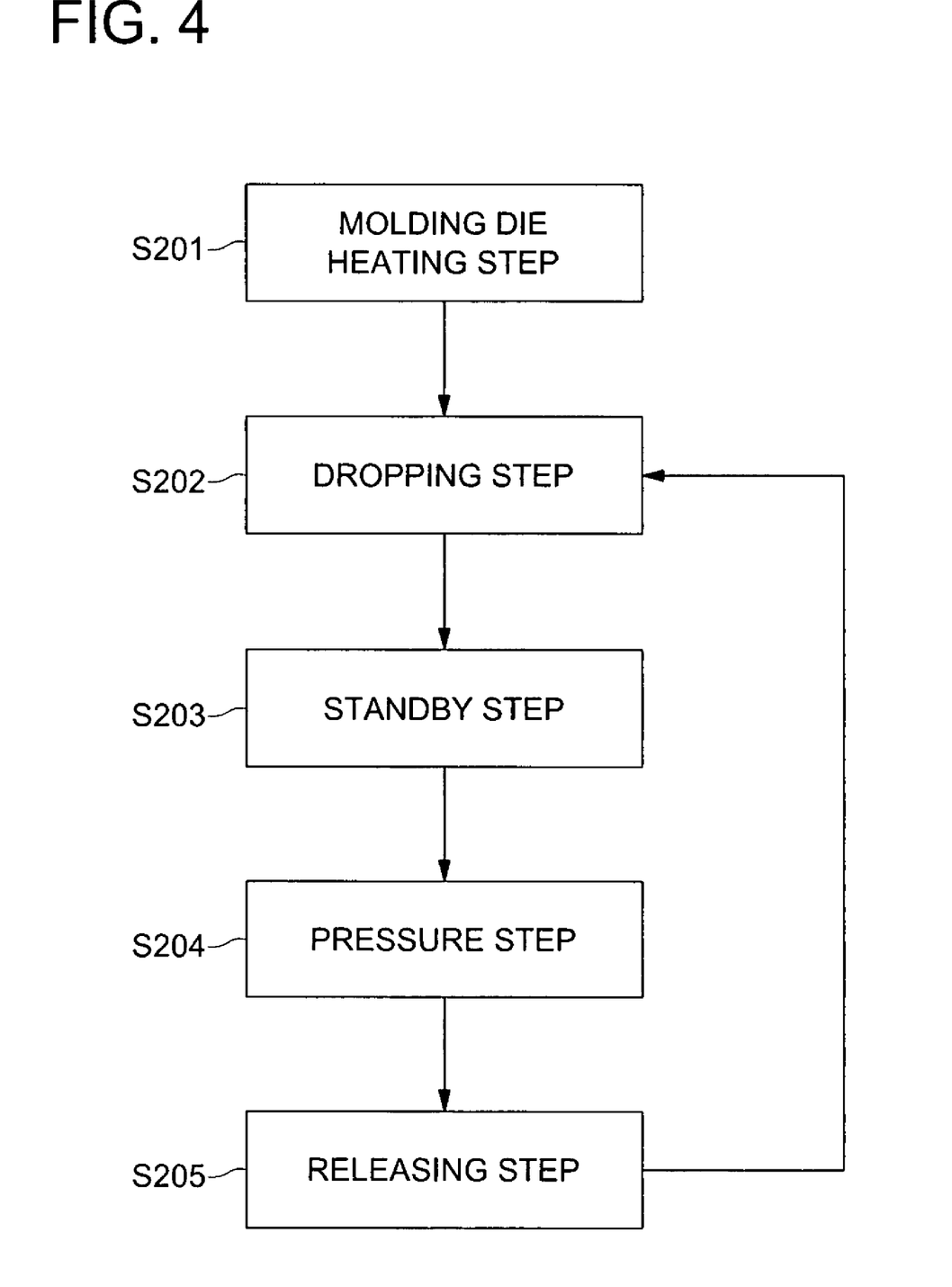
FIG. 4 is a diagram representing various steps employed in the glass optical element manufacturing method as a second embodiment.

The following describes the glass optical element manufacturing method as a second embodiment of the present invention. FIG. 4 is a diagram representing various steps employed in the glass optical element manufacturing method as a second embodiment. FIG. 5 (a), FIG. 5 (b), FIG. 5 (c) and FIG. 5 (d) are cross sectional views showing a molding die and glass optical element in the major steps in the second embodiment. The following describes various steps focusing on the differences from the aforementioned first embodiment.

Figure 5A:
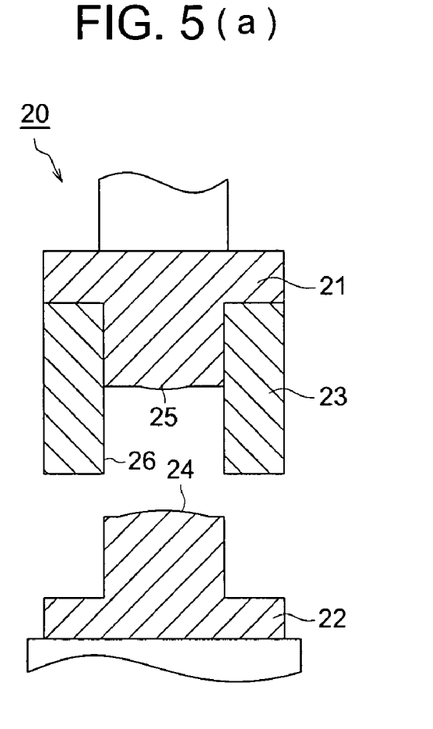

In the molding die heating Step S201, the molding die is heated to a predetermined temperature. FIG. 5 (a) is a cross sectional view of the molding die 20 in the molding die heating Step S201. The molding die 20 used in this embodiment includes an upper mold 21, lower mold 22, and side transfer member 23. The lower mold 22 contains a first transfer surface 24 having a convex shape for forming the first surface of the glass optical element, while the upper mold 21 contains a second transfer surface 25 containing a convex shape for forming the second surface of the glass optical element. The side transfer member 23 includes a side transfer surface 26 for forming the side surface of the outer periphery of the glass optical element, and is fixed in the state combined with the upper mold 21.

The difference from the first embodiment is that the side transfer member 23 is fixed in combination with the upper mold 21 in this embodiment. The material of each member, heating method, heating temperature and other factors are the same as those of the first embodiment.

Figure 5B:
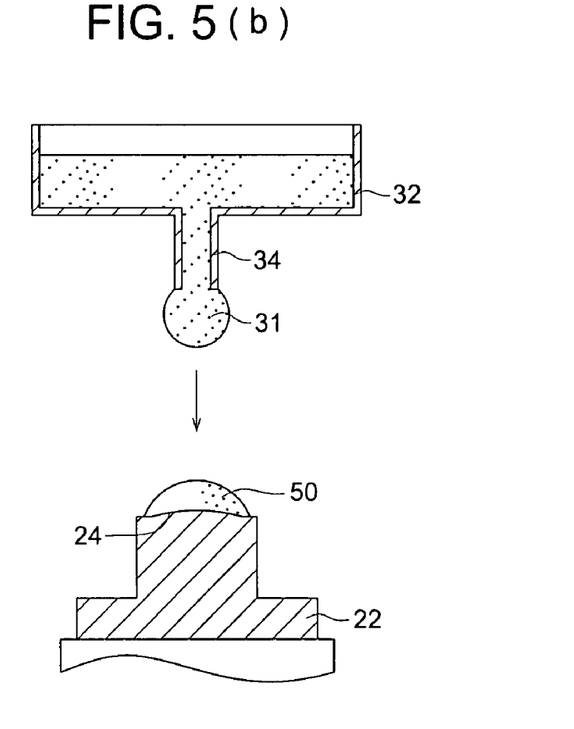

In the dropping step S202, the molten glass 31 is dropped on the heated lower mold 22, and glass is brought in contact with the first transfer surface 24 of the lower mold 22. FIG. 5 (b) shows the cross section of the molding die and others in the dropping step S202. In this Step S202, the molten glass 31 is dropped on the lower mold 22 from the nozzle 34 provided on the lower portion of the melting furnace 32, similarly to the case of the first embodiment. The glass 50 dropped on the heated lower mold 22 comes in contact with the first transfer surface 24 of the lower mold 22.

Figure 5C:
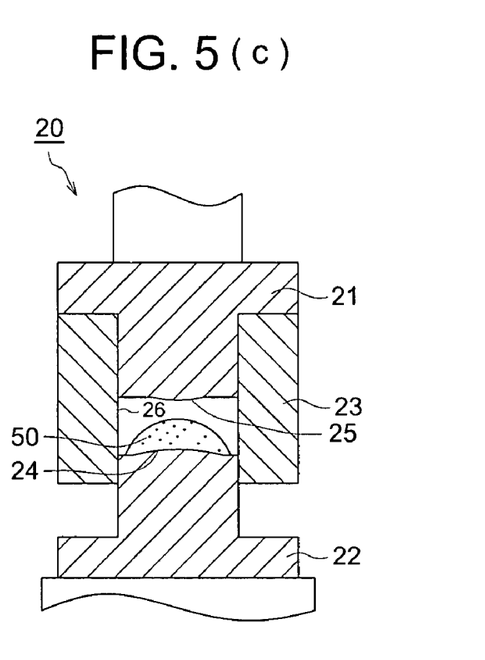

In the standby step S203, the glass 50 having been dropped waits for a predetermined time in contact with the first transfer surface 24. This is a step to cool the dropped glass 50 down to the temperature wherein the first free surface for connecting between the first surface of the glass optical element and the side surface of the outer periphery and the second free surface for connecting between the second surface and the side surface of the outer periphery are formed by the pressure applied in the next pressure step S204. FIG. 5 (c) shows the cross sections of the glass 50 dropped in the standby step S203 and the molding die 20.

The glass 50 having been dropped is in the molten state at a very high temperature immediately after glass has been dropped. Since it is in contact with the first transfer surface 24, heat is removed through this contact surface, and cooling proceeds accompanied by a gradual increase in the viscosity. Differently from the first embodiment, however, the glass is not in contact with the side transfer surface 26, and therefore, cooling of the dropped glass 50 close to the outer peripheral portion proceeds more slowly than that in the first embodiment.

Accordingly, if the upper mold 21 is moved downward and pressure is applied when the glass is not yet appropriately cooled immediately after glass has been dropped, the viscosity of glass is low and the glass is easy to deform. Thus, there is almost no formation of the first free surface for connecting between the first surface of the glass optical element and the side surface of the outer periphery, and the second free surface for connecting between the second surface and the side surface of the outer periphery. By contrast, when the dropped glass 50 kept in contact with the first transfer surface 24 waits for a predetermined time, glass is cooled and viscosity is increased. Glass will not be filled up to the position close to the boundary between the first transfer surface 24 and side transfer surface 26 and close to the boundary between the second transfer surface 25 and side transfer surface 26 by pressure. This will lead to formation of the first free surface for connecting between the first surface of the glass optical element and the side surface of the outer periphery, and the second free surface for connecting between the second surface and the side surface of the outer periphery.

As described above, the widths of the first free surface and the second free surface formed can be adjusted by regulating the standby time in the standby step S203. In the present embodiment, the viscosity is lower on the upper side of the dropped glass 50 not in contact with the first transfer surface 24 than on the lower side in contact therewith because the cooling speed is lower in the upper side. Thus, in normal cases, the width of the first free surface tends to be greater than that of the second free surface. The widths of the first free surface and the second free surface to be formed differ according to the temperature of the upper mold 21, the lower mold 22, the side transfer member 23 or the molten glass 31, the type of glass, size and shape of the glass optical element and such related factors. For this reason, the standby time is preferably determined by conducting a test. Generally, a standby time of several seconds through several tens of seconds will permit formation of the first free surface and the second free surface having the required width.

Thus, for the purpose of avoiding burrs, nicks and related defects, the widths of the first free surface and the second free surface, as viewed from the direction parallel to the center axis formed by connecting between the center of the first surface of the glass optical element and the center of the second surface, is preferably equal to or greater than 0.01 mm. For the purpose of facilitating identification between the front and rear of the glass optical element, the width of the first free surface or the width of the second free surface, as viewed from the direction parallel to the center axis formed by connecting between the center of the first surface of the glass optical element and the center of the second surface, whichever is greater, is preferably equal to or greater than twice that of the smaller width. In the present embodiment, the width of the first free surface is normally greater than that of the second free surface, as described above. The width of the first free surface is preferably equal to or greater than twice the width of the second free surface, more preferably equal to or greater than 0.3 mm.

Figure 5D:
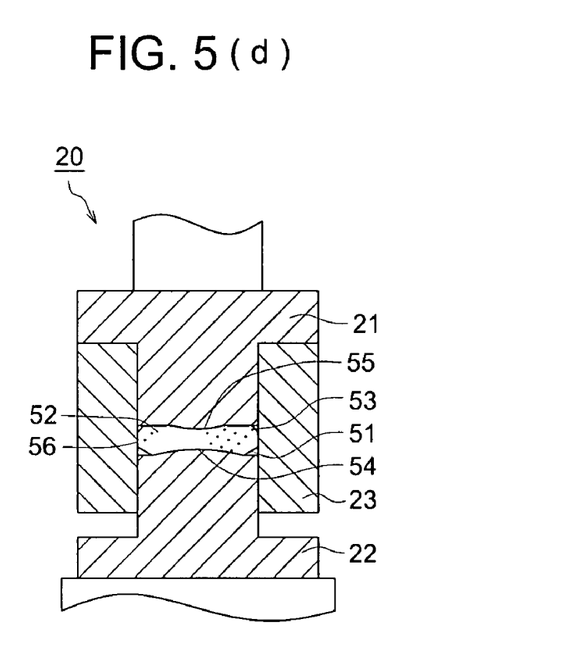

In the pressure step S204, the heated upper mold 21 and the lower mold 22 are arranged so as to be face to face with each other, and the upper mold 21 and the lower mold 22 are brought relatively close to each other so as to apply pressure to the glass 50. FIG. 5 (d) shows cross sections of the molding die 20 in the pressure step S104 and the glass optical element 52 having been produced.

A second surface 55 transferred by the second transfer surface 25 of upper mold 21, a first surface 54 transferred by the first transfer surface 24 of the lower mold 22, and the side surface of the outer periphery 56 transferred by the side transfer surface 26 of the side transfer member 23 are formed on the glass optical element 52 by the pressure given in the pressure step S204.

The pressure is applied after the glass has been cooled and the viscosity has been increased in the standby step S203. This arrangement allows formation of the first free surface 51 for connecting between the first surface 54 of the glass optical element 52 and the side surface of the outer periphery 56, and the second free surface 53 for connecting between the second surface 55 of the glass optical element 52 and the side surface of the outer periphery 56.

The releasing step S205 follows the pressure step S204 to release the pressure and to release the glass optical element 52.

After the glass optical element 52 has been released and the present step has terminated, procedures from the dropping step S202 to this step S205 are repeated. Then glass optical elements are produced on a continuous basis.

Figure 6A:
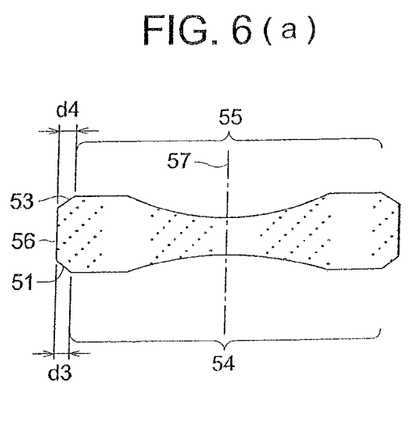
Figure 6B:
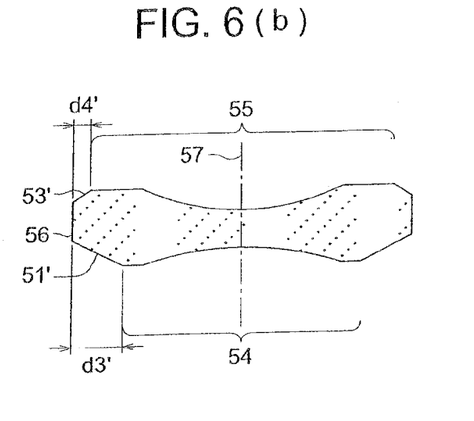

FIG. 6 (a) and FIG. 6 (b) show an example of the cross sectional view showing a glass optical element obtained in the major steps in the present embodiment. FIG. 6 (a) shows the glass optical element produced when the standby time in the standby step S203 is relatively short. FIG. 6 (b) shows the glass optical element produced when the standby time in the standby step S203 is relatively long. To ensure that the thickness of the central section is constant, adjustment is made so that the optical element of FIG. 6 (b) will have a smaller mass.

The first surface 54 of the glass optical element is the surface formed by transferring the first transfer surface 24 of the lower mold 22. The second surface 55 is formed by transferring the second transfer surface 25 of the upper mold 21. The side surface of the outer periphery 56 is formed by transferring the side transfer surface 26 of the side transfer member 23.

These glass optical elements includes: first free surfaces 51 and 51' which are formed without being in contact with any of the surfaces of the molding die 20 and is connecting between the first surface 54 and the side surface of the outer periphery; and the second free surfaces 53 and 53' which are formed without being in contact with any of the surfaces of the molding die 20 and are connecting between the second surface 55 and the side surface of the outer periphery 56. This arrangement prevents nicks or other defects from occurring to the side surface of the outer periphery.

In the case of FIG. 6 (b), the standby time is relatively long. Accordingly, the width d3' when the first free surface 51' to be formed is observed from the direction parallel to the center axis 57 formed by connecting between the center of the first surface 54 and the center of the second surface 55 is greater than the width d3 of the second free surface 51 formed in the case of FIG. 6 (a). In the meantime, although the width d4' of the second free surface 53' of FIG. 6 (b) is greater than the width d4 of the second free surface 53 of FIG. 6 (a), the amount of change is smaller than that of the first free surface. Thus, whereas the d3 is about the same size as the d4, the d3' is about 2.5 times as great as the d4'. Accordingly, in the case of FIG. 6 (b), the front and rear sides of the optical element can be easily identified by checking the difference in the width of the two free surfaces on the front and rear sides from the direction almost parallel to the center axis 57.

The optical element as an embodiment of the present invention is provided with a first free surface and a second free surface formed without contacting any of the surfaces of the molding die. This arrangement prevents nicks from occurring on the side surface of the outer periphery.

In addition, the optical element of another embodiment of the present invention is provided with the first free surface and the second free surface which are formed without coming into contact with any of the surfaces of the molding die, and have different widths. This arrangement prevents nicks from occurring on the side surface of the outer periphery, and ensures easy identification of the front and rear sides.

Further, according to an embodiment of the optical element manufacturing method of the present invention, pressure is applied after the lapse of a predetermined time subsequent to dropping of the molten glass, whereby the first free surface and the second free surface are formed. This arrangement ensures formation of the high precision optical surface and prevents nicks from occurring on the side surface of the outer periphery.

In addition, another embodiment of the optical element manufacturing method of the present invention provides a glass optical element wherein pressure is applied after the lapse of a predetermined time subsequent to dropping of the molten glass, and the first free surface and the second free surface having different widths are formed. This arrangement prevents nicks from occurring on the side surface of the outer periphery while forming a high precision optical surface, and ensures easy identification of the front and rear sides.

EXAMPLE

Examples 1 Through 3

A glass optical element was manufactured according to the step of FIG. 1 using the molding die 10 of FIG. 2 (a), FIG. 2 (b), FIG. 2 (c) and FIG. 2 (d). The ultrahard material mainly made up of the tungsten carbide was used as the materials of the upper mold 11, the lower mold 12 and the side transfer member 13.

The outer diameter of the glass optical element manufactured was 6 mm and the thickness of the central section was 3.2 mm. The phosphoric acid glass having a Tg (glass transition temperature) of 480° C. was used as a glass material.

The heating temperature in the molding die heating step S101 was 450° C. for the upper mold 11, 500° C. for the lower mold 12, and 500° C. for the side transfer member 13. In the dropping step S102. Glass having a temperature of 1000° C. was dropped onto the lower mold. The three standby time conditions of four, six and eight seconds were used in the standby step S103. The mass of the glass under each condition was 190 mg, 180 mg and 170 mg. It was adjusted according to the stand by time to adjust the thickness of the central section. In the pressure step S104, after pressure of 1200 N was applied for ten seconds, the pressure was released to get the completed glass optical element.

The glass optical element produced under the aforementioned three conditions was evaluated to check the width of the first free surface viewed from the direction parallel to the center axis, the width of the second free surface viewed from the direction parallel to the center axis, presence or absence of nicks, and ease of identification of the front and rear sides. Table 1 shows the evaluation result. To check the ease of identification of the front and rear sides, ease of identification of the first free surface and the second free surface was examined by visual observation as follows: A was assigned if identification was very easy when only one side was examined; B was assigned if identification was easy when two sides were compared for observation; C was assigned if identification was possible by technical skill; and D was assigned if identification was difficult.

TABLE 1

| | Standby time (sec.) | Width of 1st free surface (mm) | Width of 2nd free surface (mm) | Presence or absence of nicks | Ease of front/rear identification |
|---|---|---|---|---|---|
| Example 1 | 4 | 0.1 | 0.15 | Absent | C |
| Example 2 | 6 | 0.1 | 0.25 | Absent | B |
| Example 3 | 8 | 0.1 | 0.4 | Absent | A |

No nick was observed under any of the aforementioned three conditions, and excellent glass optical element products were obtained. Further, when the standby time was 8 or 6 seconds, A or B was assigned to the item of "Ease of front/rear identification". Thus, the result was satisfactory.

Comparative Example 1

Glass optical elements were manufactured under the same conditions as those of Examples 1 through 3 except that the standby time was 2 seconds (glass mass: 200 mg), and were evaluated. Table 2 shows the result.

TABLE 2

|  | Standby time (sec.) | Width of 1st free surface (mm) | Width of 2nd free surface (mm) | Presence or absence of nicks | Ease of front/rear identification |
|---|---|---|---|---|---|
| Comparative example 1 | 2 | 0.1 | less than 0.01 | Nicks found on outer periphery of 2nd surface | B |

Due to excessively short standby time, almost no second free surface was formed, and nicks were observed. Satisfactory glass optical element products could not be gained.

Examples 4 Through 6

According to the steps shown in FIG. 4, glass optical elements were manufactured using the molding die 20 given in FIG. 5(a), FIG. 5(b), FIG. 5(c) and FIG. 5(d). Silicon carbon was used as a material of the upper mold 21 and the lower mold 22, and aluminum nitride was used as a material of the side transfer member 23.

The glass optical element produced had an outer diameter of 8 mm and the central section had a thickness of 2 mm. The glass was made of lanthanum glass with Tg (glass transition temperature) of 640° C.

The heating temperature in the molding die heating Step S201 was 580° C. for the upper mold 21, 620° C. for the lower mold 22, and 580° C. for the side transfer member 23. In the dropping step S202, the glass of 1100° C. was dropped onto the lower mold. The standby time conditions of 6, 8 and 10 seconds were used in the standby step S203. The glass masses under these standby time conditions were 230 mg, 220 mg and 210 mg. Adjustment was made in response to the standby time wherein the thickness of the central section was adjusted. In the pressure step S204, a pressure of 1500 N was applied for 15 seconds, and pressure was released. Then the glass optical element products were taken out.

The glass optical element produced under the aforementioned three conditions was evaluated to check the width of the first free surface, the width of the second free surface, presence or absence of nicks, and ease of identification of the front and rear sides. Table 3 shows the evaluation result. To check the ease of identification of the front and rear sides, ease of identification of the first free surface and the second free surface was examined by visual observation as follows: A was assigned if identification was very easy when only one side was examined; B was assigned if identification was easy when two sides were compared for observation; C was assigned if identification was possible by technical skill; and D was assigned if identification was difficult.

TABLE 3

|  | Standby time (sec.) | Width of 1st free surface (mm) | Width of 2nd free surface (mm) | Presence or absence of nicks | Ease of front/rear identification |
|---|---|---|---|---|---|
| Example 4 | 6 | 0.15 | 0.1 | Absent | C |
| Example 5 | 8 | 0.28 | 0.12 | Absent | B |
| Example 6 | 10 | 0.45 | 0.15 | Absent | A |

No nick was observed under any of the aforementioned three conditions, and excellent glass optical element products were obtained. Further, when the standby time was 10 or 8 seconds, A or B was assigned to the item of "Ease of front/rear identification". Thus, the result was satisfactory.

Comparative Example 2

Glass optical elements were manufactured under the same conditions as those of Examples 4 through 6 except that the standby time was 4 seconds (glass mass: 240 mg), and were evaluated. Table 4 shows the result.

TABLE 4

|  | Standby time (sec.) | Width of 1st free surface (mm) | Width of 2nd free surface (mm) | Presence or absence of nicks | Ease of front/rear identification |
|---|---|---|---|---|---|
| Comparative example 2 | 4 | less than 0.01 | less than 0.01 | Nicks observed on outer periphery of 1st and 2nd surefaces | D |

Due to excessively short standby time, almost no first or second free surface was formed, and nicks were observed. Satisfactory glass optical element products could not be obtained.

What is claimed is:

1. A glass optical element, comprising:
a first surface which is formed by transcription of a first transfer surface of a molding die;
a second surface which is formed by transcription of a second transfer surface of the molding die and faces the first surface;
a peripheral side surface which is formed by transcription of a side transfer surface of the molding die;
a first free surface which is formed without contacting with any one of the first transfer surface, second transfer surface and the side transfer surface and connects the first surface and the peripheral side surface so as to define a first width between the first surface and the peripheral side surface, wherein the first width is a first distance, as viewed from a direction parallel to an axis connecting a center of the first surface and a center of the second surface; and
a second free surface which is formed without contacting with any one of the first transfer surface, second transfer surface and the side transfer surface and connects the second surface and the peripheral side surface so as to define a second width between the second surface and the peripheral side surface, wherein the second width is a second distance, as viewed from the direction parallel to the axis, wherein the first width is a magnitude that is at least twice a magnitude of the second width, or the second width is a magnitude that is at least twice a magnitude of the first width.

2. The glass optical element of claim 1, wherein at least one of the first width and the second width has a magnitude that is greater than or equal to 0.3 mm.

* * * * *